United States Patent [19]

Roman

[11] Patent Number: 4,886,458

[45] Date of Patent: Dec. 12, 1989

[54] MECHANICAL ANALOG COMPUTER DEVICE

[76] Inventor: Robert J. Roman, 174 New Wickham Dr., Penfield, N.Y. 14526

[21] Appl. No.: 212,008

[22] Filed: Jun. 27, 1988

[51] Int. Cl.$^4$ .............................................. G09B 19/16
[52] U.S. Cl. ................................. 434/243; 235/88 N
[58] Field of Search .............. 434/239, 240, 241, 243, 434/244; 235/88 N

[56] References Cited

U.S. PATENT DOCUMENTS

| 2,402,271 | 6/1946  | Andrews       | 434/243 |
| 3,364,297 | 1/1968  | Osborne, Jr.  | 434/243 |
| 3,485,929 | 12/1969 | Tillery       | 434/243 |
| 3,507,969 | 4/1970  | Greenwade     | 434/243 |
| 4,095,351 | 6/1978  | Eisele        | 434/243 |
| 4,173,080 | 11/1979 | Minmicks, III | 434/243 |
| 4,608,022 | 8/1986  | Bellofatto    | 434/243 |
| 4,790,758 | 12/1988 | Bellofatto    | 434/243 |

Primary Examiner—William H. Grieb

[57] ABSTRACT

This invention provides an inexpensive but accurate mechanical analog computer device for providing information based on the relative positions of two or more indicia bearing members at least one of which is mounted to another of said members for non-rotational orbital movement. More particularly a preferred embodiment of the invention is directed to a visual-mechanical device which simulates ADF and/or VOR navigation such that students and experienced pilots can develop skills at home, and also use the device as a reference tool in actual flight. The device incorporates a disc assembly which revolves or orbits non-rotationally about a beacon representation, driven by a lever which also rotates about the Beacon. The discs and lever have representations of the dials, pointers and windows necessary for unambiguous simulation of ADF and/or VOR navigation without interchange of parts.

24 Claims, 8 Drawing Sheets

SECTION A-A

INSETS

INSETS

MECHANICAL ANALOG COMPUTER DEVICE

BACKGROUND OF THE INVENTION

1. Field of the Invention

The present invention relates to simple mechanical analog computer devices, and more particularly to compact training and navigation aids for Automatic Direction Finder (ADF) and Very High Frequency Omni Range (VOR) navigation systems. It further involves visual and mechanical simulation of these primarily aircraft navigation systems for home study and for reference in actual flight.

2. Description of Prior Art

Previously known mechanical analog computer devices of the general type to which the present invention relates fall into two categories; namely, cards with two or more concentric rotating dials that show relative angles for ADF and pictures of VOR Meter readings for typical aircraft positions around a beacon, and devices which have two or more concentric dials comprising a dial assembly that is mounted to a support member, such that the dial assembly can be revolved or orbited around an axis representing the beacon center, without rotating about its own axis. Throughout this specification this movement is referred to as non-rotational orbiting.

A device of the latter type, which can show actual aircraft position and actual meter readings for totally unambiguous simulation is disclosed in U.S. Pat. No. 3,485,929, issued to William W. Tillery on Dec. 23, 1969. This device, however, is relatively bulky and expensive because of the use of gears and appropriate supports to mount the non-rotational orbiting dial assembly. Furthermore, gear backlash must be near zero to maintain required accuracy for unambiguous meter readings and this results in more cost and bulkiness. Additionally, that device pertains only to ADF simulation or its derivatives, not to ADF and/or VOR simulation. Whereas ADF is commonly used as a back-up, VOR is the primary system used for most current aerial navigation.

SUMMARY OF THE INVENTION

This invention is directed to devices of the second type described above and more particularly to navigation devices that provide for ADF and VOR simulation while also eliminating bulky, complex and costly mechanical elements through the use of a novel three bar linkage to provide for non-rotational orbiting movement.

A first object of this invention is to provide an inexpensive but accurate mechanical analog computer device for providing information based on the relative positions of two or more indicia bearing members at least one of which is mounted to another of said members for non-rotational orbital movement.

A second object of this invention is to provide an inexpensive device which will allow students and experienced pilots to study ADF navigation simulated in an "out of the cockpit" environment. This not only saves expensive flying time, but allows for more efficient learning where there are no distractions such as piloting an aircraft. The novel three bar linkage is an inherently low cost way to achieve non-rotational orbiting dial assembly movement but, in addition, the pin-in-hole link pivots provide low cost mounts which are very accurate. A transparent lever member provides drive for the aircraft simulator, incorporates meter indicators and wraps around the device applying sufficient pressure to hold it together.

A third object of this invention is to provide an inexpensive device which will allow students and experienced pilots to study VOR navigation simulated as above. Further, it is intended to provide a combination VOR and ADF device which will simulate both navigation systems. This device provides for such a combination by adding VOR indicators and windows to the transparent lever that carries ADF indicators, and using the ADF dials and pointers for multiple purposes.

A further object of this invention is to provide such a device that is compact and so easy to operate so that it will be useable as a cockpit reference during actual flight. Because of the inherent flat structure of a link connected device, the novel nested dial layout and the multipurpose dials and indicators, the simulator is truly compact. No interchangeable parts are required, the device will fit into a pilots chart case, and it can be operated easily using only one hand.

DESCRIPTION OF THE PREFERRED EMBODIMENT

Figure 1:
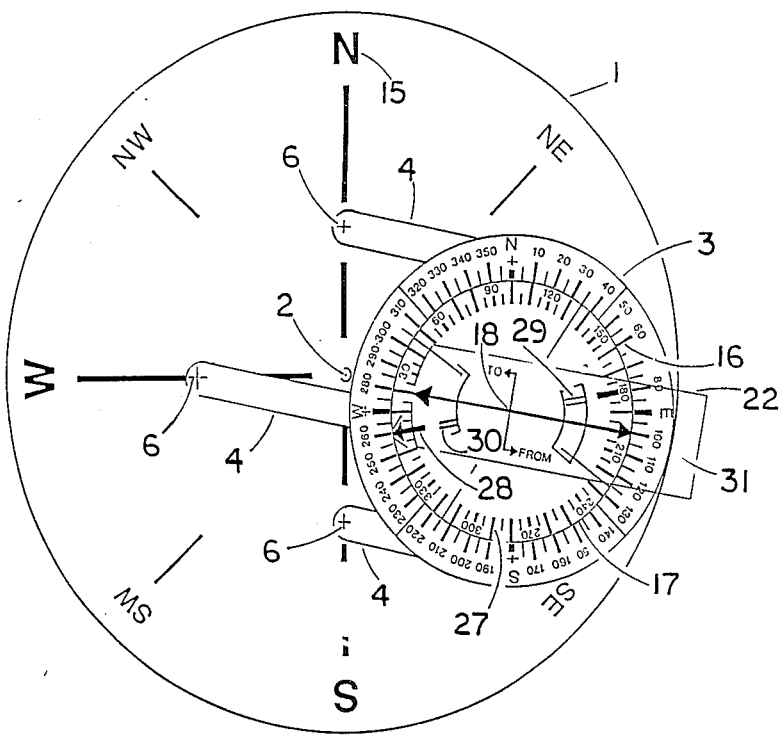
FIG. 1 is a plan view showing a preferred illustrative embodiment of the mehcanical analog computer device, an ADF/VOR simulator, with elements positioned to best show component parts.

Referring to FIG. 1, the mechanical analog computer device consists of an area plate (1) having a station center (2) which represents an Automatic Direction Finder (ADF) or Very High Frequency Omni Range (VOR) beacon ground site. An orbiting disc (3) is mounted to non-rotationally orbit station center (2) by links (4) which are rotatably mounted to the upper face of area plate (1) and the under side of orbiting disc (3) as viewed in FIG. 1.

Figure 2:
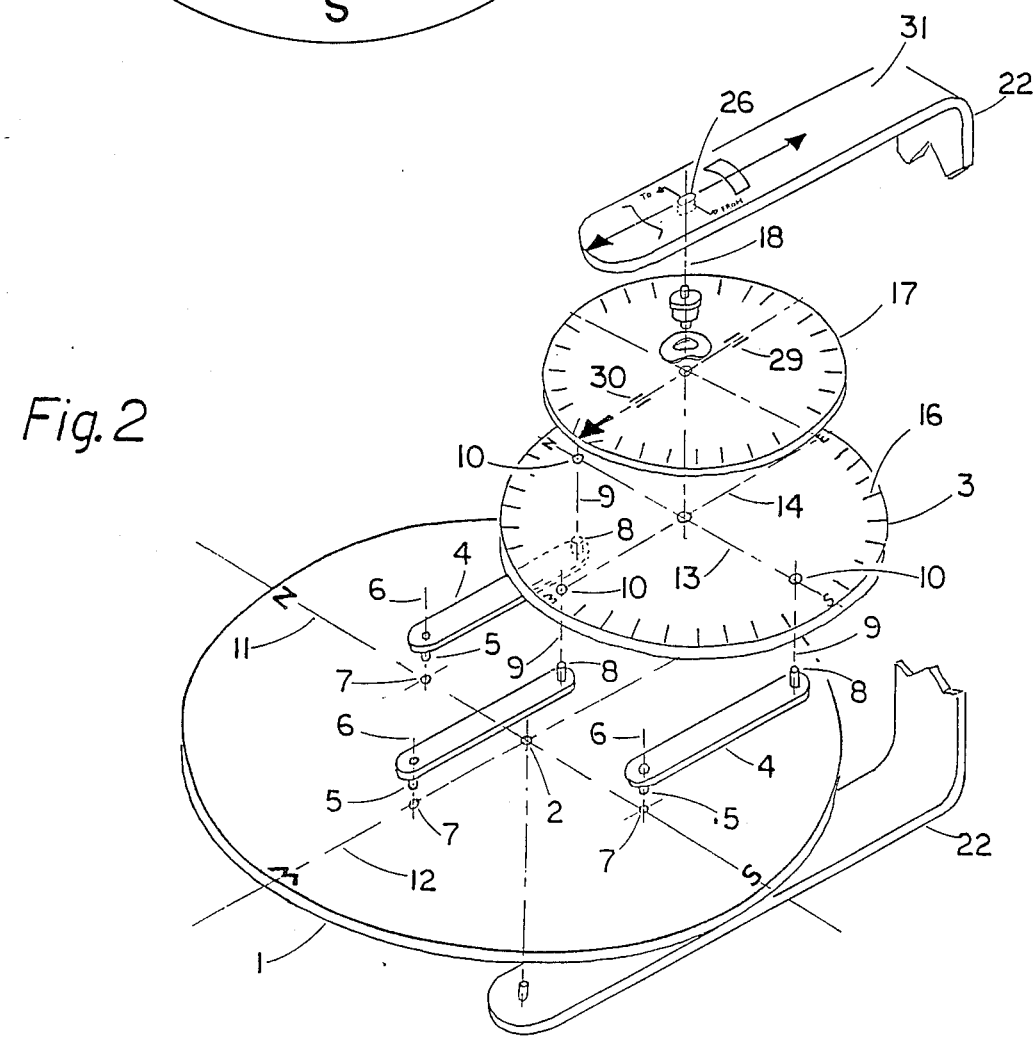
FIG. 2 is an exploded view of the illustrative embodiment for the ADF/VOR simulator which shows how the parts are assembled.

Referring to FIG. 2, links (4) are mounted to area plate (1) by pins (5) fastened to links (4) at first ends (6) and extending outward from one surface of links (4). These pins (5) are inserted into holes (7) in area plate (1) to form a rotatable connection.

Links (4) are mounted to orbiting disc (3) by pins (8) fastened to links (4) at second ends (9) and extending outward from the surface opposite that of pins (5). These pins (8) are inserted into holes (10) in orbiting disc (3) to form a rotatable connection.

Mounting holes (7) are located in area plate (1) such that line (11) passes thru station center (2) and two holes (7). The third hole (7) is located on line (12) which is perpendicular to line (11) and also passes thru station center (2). Mounting holes (10) in orbiting disc (3) are similarly located on lines (13) and (14).

On orbiting disc (3) the two mounting holes (10) on line (13) preferably are equidistant from center (18), and the third mounting hole (10) on line (14) is a distance from center (18) appropriate to the size of the orbiting disc and the length of the links. These hole locations are referred to as pattern dimensions on the orbiting disc. On area plate (1), corresponding pattern dimensions of mounting holes (7) relative to station center (2) must be identical to those on the orbiting disc.

If links (4) are of equal length with equal dimensions between first ends (6) and second ends (9) and the length is chosen appropriately, orbiting disc (3) will be free to orbit 360 degrees about station center (2) with no interference between the links. Further, this unique arrangement will now allow either disc to rotate about its own center, the movement described as non-rotational orbiting.

This arrangement is technically a three-bar linkage. However, only the two links (4) located on line (11) are required to allow orbiting disc (3) to non-rotationally orbit 360 degrees about station center (2), but they would be unstable as the links neared co-axialism (In the vicinity of N and S on area plate (1)). The link (4) located on line (12) stabilizes the other two links when they are nearly co-axial and is non-functional at other times. Although the linkage is over-constrained as described, it functions smoothly if reasonable accuracy is maintained with link length and mounting dimensions.

To form a useful device from the foregoing structure, additional elements are required as follows:

Referring to FIG. 1, area plate (1) incorporates basic indicia of direction (15) which are desirable, but not required. Orbiting disc (3) has indicia of direction and location (16) represented in at most 5 degree increments. Indicia (16) have a triple function. They will represent aircraft headings for the ADF simulator, omnibearing dial settings for the VOR simulator and radial positions of a simulated aircraft for both the ADF and VOR simulators.

A meter disc (17) is rotatably and resistively mounted to orbiting disc (3) so their centers coincide to form a common center (18). Disc (17) is preferably smaller in diameter than orbiting disc (3) so that dial (16) will be visible when an opaque disc (17) is mounted to disc (3).

Figure 3:
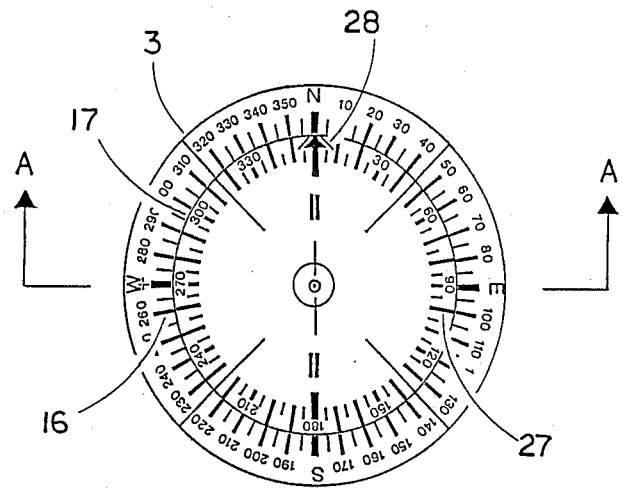
FIG. 3 is a plan view of the two smaller discs.
Figure 4:
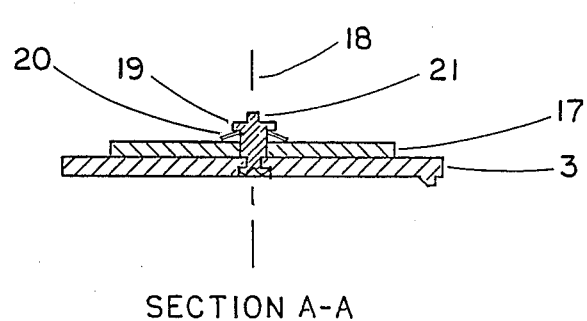
FIG. 4 is a sectional view, along Section A—A of FIG. 3, showing details of the rotational and resistive connection of the discs.

Referring to FIGS. 3 and 4, meter disc (17) is shown to be concentrically mounted to orbiting disc (3) with shoulder stud (19) that captures spring (20) to form a rotatable and resistive mounting. Center stud portion (21) of shoulder stud (19) will serve to couple this assembly as will be described later.

Referring primarily to FIG. 1, meter disc (17) has indicia of direction (27) similar to indicia (16) on orbiting disc (3) except that the 0, 90, 180 and 270 degree indicia are not marked N, E, S and W as on the orbiting disc and it has a pointer (28) with a double arrow head in place of the 0 degree indice. In addition, on an imaginary line between the 0 and 180 degree indicia, there are course deflection needle representations (29) and (30).

Figure 5:
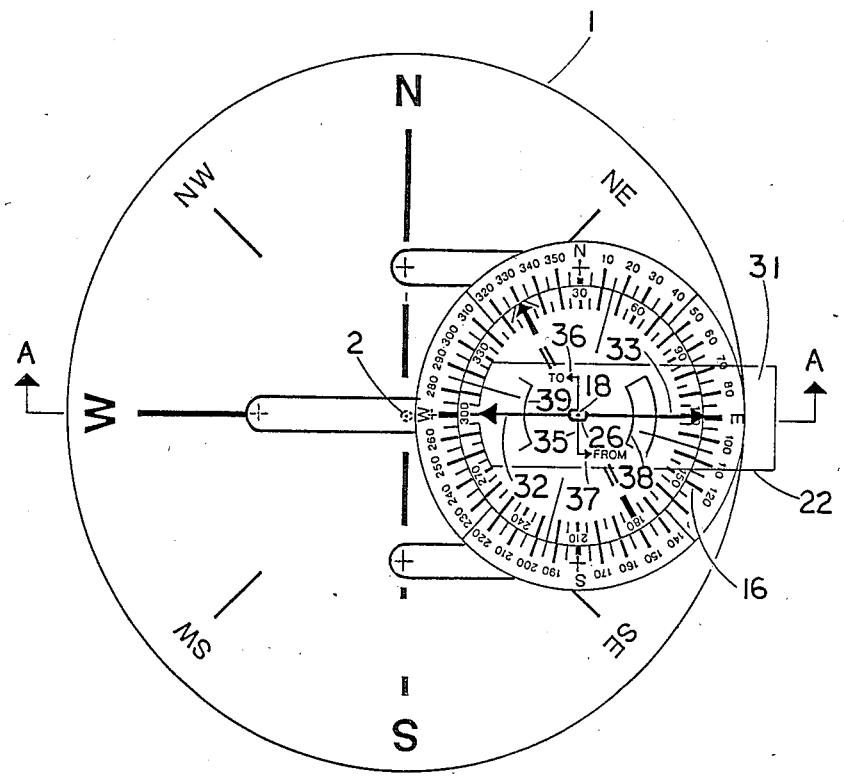
FIG. 5 is an additional plan view of the illustrative embodiment shown in FIG. 1, with the elements repositioned to support a sectional view.
Figure 6:
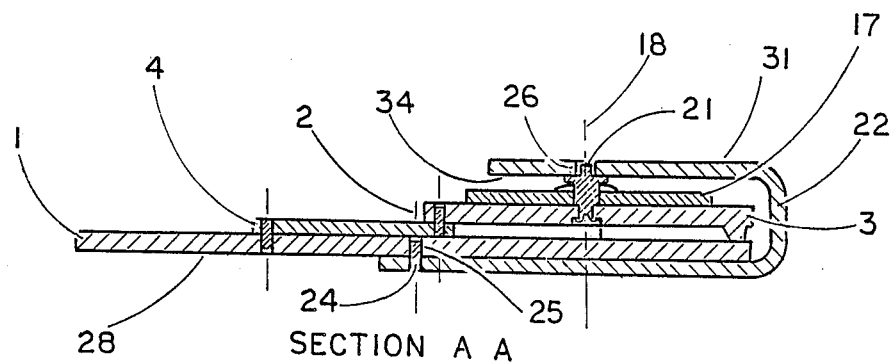
FIG. 6 is a sectional view, along Section A—A of FIG. 5, which shows details of the simulator's overall assembly.

The final major element required for this mechanical analog computing device to function as an ADF and VOR simulator is the aircraft movement lever (22) shown in FIGS. 1, 2, 5 and 6. Referring to FIGS. 5 and 6, lever (22) is rotatably mounted to the underside (23) of area plate (1) by pin (24) which is fastened to lever (22) and protrudes into hole (25) on center (2) of area plate (1) to form a rotatable connection. The lever is made from a resilient material (transparent in the preferred case) which is formed in a general "U" shape as shown best in FIG. 6. Slot (26) in lever (22) engages center stud portion (21) on center (18) to form a rotatable and slideable connection. Lever (22) can be temporarily distorted to fit over stud portion (21) such that when the assembly is complete as shown in FIG. 6, pressure exists to hold all elements together without requiring further fastening at any pin pivot point.

Referring primarily to FIG. 5, lever (22) is transparent such that markings on surface (34) (FIG. 6) will be visible thru upper surface (31) (FIG. 6) of lever (22). On surface (34), and visible thru surface (31), is station arrow (32) which is a representation of the indicating needle of an ADF meter that always points to the ADF ground station. Station arrow (32) points away from common center (18) on the center (2) side, while radial arrow (33) extends away from center (18) on the opposite side. Radial arrow (33) points to indicia of direction and location (16) on orbiting disc (3). The indice pointed to by arrow (33) always represents the radial from station center (2) on which the simulated aircraft is located. The simulated aircraft is always assumed to be at common center (18). Both arrows (32) and (33) are on an imaginary straight line which intersects station center (2) and common center (18).

Also on surface (34), and visible thru surface (31), is TO-FROM line (35) with TO arrow (36) indicating that all aircraft headings on the TO side of the TO-FROM line bring the aircraft closer to the ground station, while FROM arrow (37) indicates that all aircraft headings on the FROM side of the TO-FROM line bring the aircraft farther from the station. The TO-FROM line and arrows are significant for VOR navigation and will be explained later.

Finally, forward sensing window (38) and reverse sensing partial window (39) are on surface (34) and visible thru surface (31). Window (38) is bisected by the shaft of arrow (33), and partial window (39) is bisected by the shaft of arrow (32). These windows are significant for VOR simulation and their function will be explained later.

In order to demonstrate how this mechanical analog computer device can be used to simulate actual ADF and VOR navigation situations, some navigation examples will be shown. The value of active simulation for instruction, training and cockpit reference will become apparent.

ADF Navigation

Figure 7:
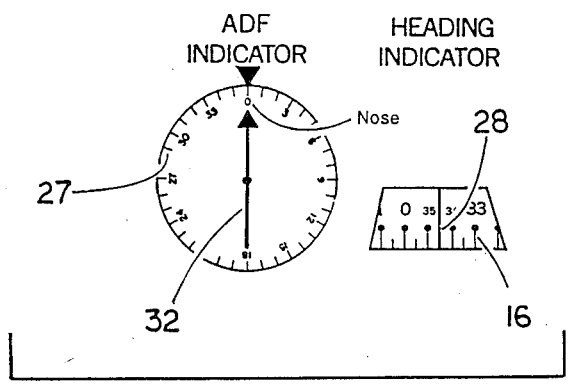
FIG. 7 is a representation of two actual aircraft instruments: an ADF Indicator and a Heading Indicator, both having numerals identifying parts similar to those of the simulator.

ADF navigation is based on a ground beacon that radiates in all directions simultaneously. The ADF needle in the aircraft ADF meter points to the beacon at all times, and its reading is arranged to always show the angle between the "nose" (or longitudinal axis) of the aircraft and the beacon. FIG. 7 shows an actual ADF indicator and a heading indicator as they appear in an aircraft. On the ADF indicator, features similar to those of the simulator are the "nose" or 0 position, station arrow (32) and meter dial (27). On the heading indicator, pointer (28) is shown along with dial (16).

ADF Navigation Example

Figure 9:
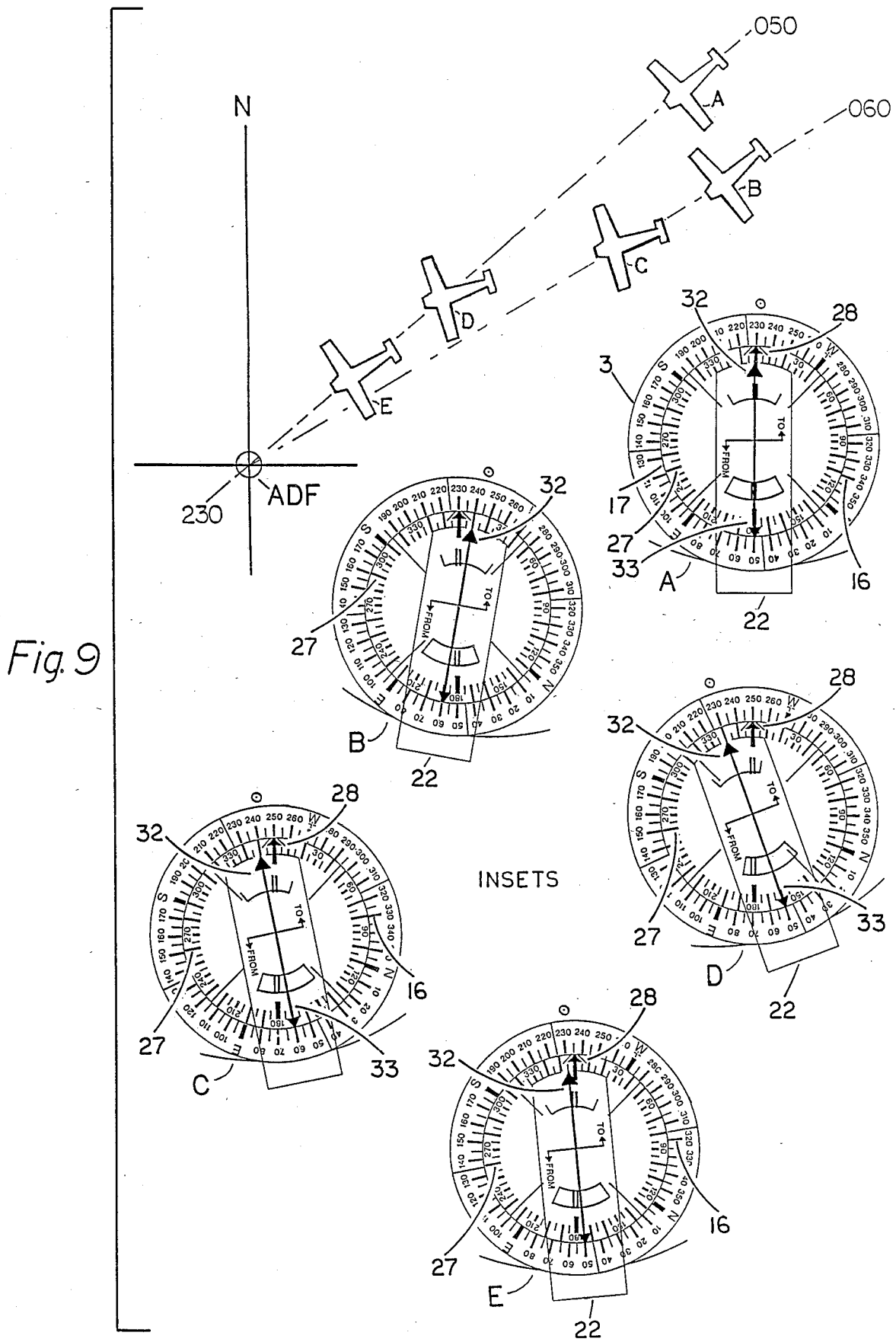
FIG. 9 shows aircraft positions and simulator insets that illustrate use of the simulator for ADF navigation.

FIG. 9 illustrates a typical ADF navigation problem. The aircraft shown at position A is on the 50 degree radial from the ADF beacon, and is flying on a heading of 230 degrees toward the beacon. This situation is shown on the corresponding simulator inset also marked A.

The pointer with double arrow head (28) locates the 0 or "nose" position of the ADF dial (27) on meter disc (17). (This can be seen clearly in FIG. 3). Since this dial is always viewed in an aircraft with the 0 or "nose" position at the top (See FIG. 7), it will always be viewed this way when using the simulator. Pointer (28) serves the dual purpose of being 0 on the ADF meter dial and the aircraft heading indicator, pointing to the aircraft heading on dial (16) of orbiting disc (3).

In inset A, pointer (28) is set to the aircraft heading of 230 degrees on dial (16) of orbiting disc (3) and note that radial arrow (33), on aircraft movement lever (22), points to the aircraft position on the 50 degree radial of dial (16). Since the aircraft shown at A is on the 50 degree radial on a 230 degree heading, station arrow (32) on lever (22) points to 0 on the ADF meter dial (27) indicating a 0 degree relative bearing to the beacon.

At position B the aircraft is shown to still be on a 230 degree heading, but because of wind from the Northwest the aircraft has been blown to position B on the 60 degree radial. In inset B the aircraft movement lever (22) has been moved to show the aircraft on the 60 degree radial with the heading still at 230 degrees. As a consequence, station arrow (32) now points to 010 degrees on ADF meter dial (27) showing the beacon now to be on a 010 degree relative bearing to the right as the aircraft is currently headed. It is important to note that in this, and all other examples, the simulator shows exactly the same ADF meter reading as that in an aircraft for the same position and heading.

In position C, the aircraft is still on the 60 degree radial, but the pilot has turned the aircraft 20 degrees to the right in order to regain the original 230 degree radial. Accordingly, the simulator in inset C shows the aircraft still on the 60 degree radial (radial arrow (33) points to 60 degrees on Dial (16)), but the heading has been changed to 250 degrees (pointer (28) the heading indicator points to 250 degrees on dial (16)). Note: with the new heading, the ADF meter will read 350 degrees or a 10 degree relative angle to the left (station arrow (32) points to 350 degrees on ADF meter dial (27)).

When the aircraft gets back to the 50 radial as shown in position D, the relative angle should be 20 degrees left as the course was altered 20 degrees right in order to oppose the wind sufficiently to get back to the radial. To simulate this situation as shown in inset D, the heading indicator pointer (28) remains at 250 degrees on dial (16) and the aircraft movement lever (22) is moved back to the 50 degree radial such that radial arrow (33) points to 50 degrees on Dial (16). Thus when the aircraft has achieved the position shown at D, the simulator shows the 20 degree left relative angle as station arrow (32) now points to 340 degrees on meter dial (27).

In order to stay on the 50 degree radial, the pilot turns the aircraft to a new heading of 235 degrees as shown in position E and inset E. This added 5 degrees of heading is an estimate of the heading into the wind required to prevent the aircraft from being blown off the radial again. As expected, the ADF meter now shows a 5 degree left relative angle with heading pointer (28) pointing to the new heading 235 degrees on dial (16) and station arrow (32) pointing to 355 degrees on meter dial (27). If the meter reading does not change, the aircraft is continuing to track inbound on the 50 degree radial.

As previously shown, the ADF meter reading depends on position and heading of the aircraft. Any two settings will determine the third. As the example illustrates, the inexpensive simulator can be used for training in ADF navigation without using expensive actual flying time. Because it is compact and easy to operate, the simulator also can be used as a valuable reference tool during actual flight. For instance, if the simulator is set with the aircraft heading and a radial to be intercepted, the simulator will indicate what the ADF Meter reading will be at intercept. Another common use is where the pilot knows the aircraft heading and meter reading, and when these are set into the simulator, the radial position of the aircraft can be read unambiguously.

VOR Navigation

Figure 8:
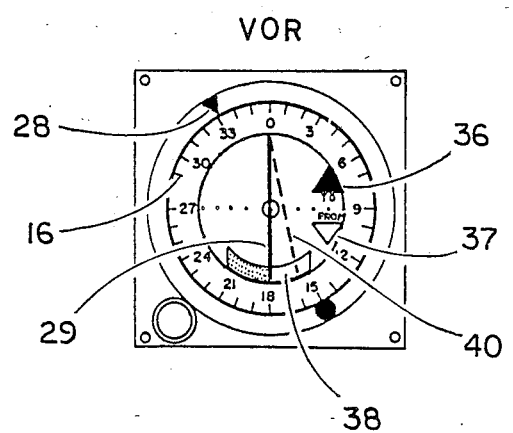
FIG. 8 is a representation of an actual VOR instrument with numerals identifying parts similar to those of the simulator.

VOR navigation is based on a beacon that transmits a narrow rotating beam and transmits a timing signal as the beam passes 0 degrees, such that the instrument in the aircraft can determine what angle the beam is at when it passes through the aircraft. FIG. 8 shows an actual VOR instrument as it appears in an aircraft with features numbered that are similar to those of the simulator. The instrument has a course selector (or omnibearing selector—OBS) (28) which allows a desired course (or radial which is the reciprocal of course when inbound) to be set on Dial (16). When the aircraft is on the course (or radial) that has been set, the course deflection indicator (CDI) (29) (see FIG. 8) will be centered in window (38). As previously mentioned, any course selected that would (if flown) bring the aircraft closer to the beacon will be on the TO side of the simulator TO-FROM line (35) (FIG. 5), and consequently would cause the TO arrow (36) to be visible in an actual VOR instrument as shown in FIG. 8. Conversely, any course selected which would (if flown) bring the aircraft farther from the beacon will be on the FROM side of simulator TO-FROM line (35), and consequently would cause the FROM arrow to be visible in an actual VOR instrument. The TO and FROM arrows are commonly called flags; thus in the following when a TO or FROM flag is said to be visible, it means the TO or FROM arrow appears in the VOR instrument, and on the simulator the OBS (28) is on the TO or FROM side of the TO-FROM line respectively.

Presence of a TO or FROM flag and deflection of the CDI (29) are not related to the actual heading of the aircraft, but only to the position of the aircraft and the setting of the OBS (28). Actual heading of the aircraft is important for interpretation of CDI deflection. For instance, with the CDI deflected to the right as shown dotted (40) in FIG. 8, with the TO flag visible and the aircraft headed in any direction that will bring it closer to the beacon, the aircraft must be flown to the right (or toward the needle) to cause the needle to center (meaning the aircraft is on the selected radial such that flying the selected course will result in flight directly to the beacon). This is called "forward sensing". Conversely (with the TO flag visible), if the aircraft is headed in any direction that will bring it farther from the beacon, the aircraft must be flown to the left (or away from the needle) to cause the needle to center (the aircraft is on the selected radial such that flying the reciprocal of the selected course will result in flight directly away from the beacon). This is called "reverse sensing".

VOR Navigation Examples

Figure 10:
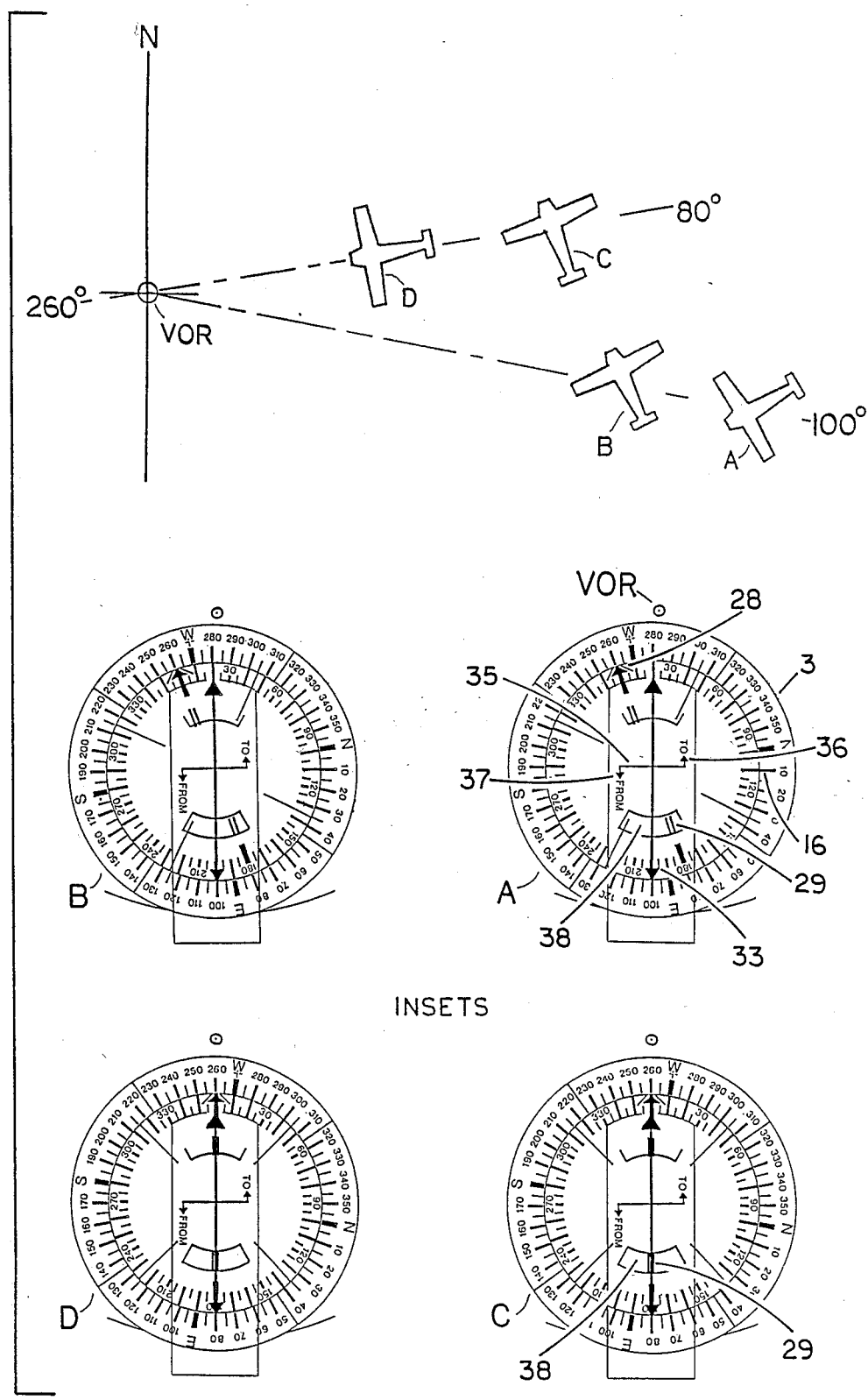
FIG. 10 shows aircraft positions and simulator insets that illustrate use of the simulator for VOR radial intercept and navigation inbound to a beacon.
Figure 11:
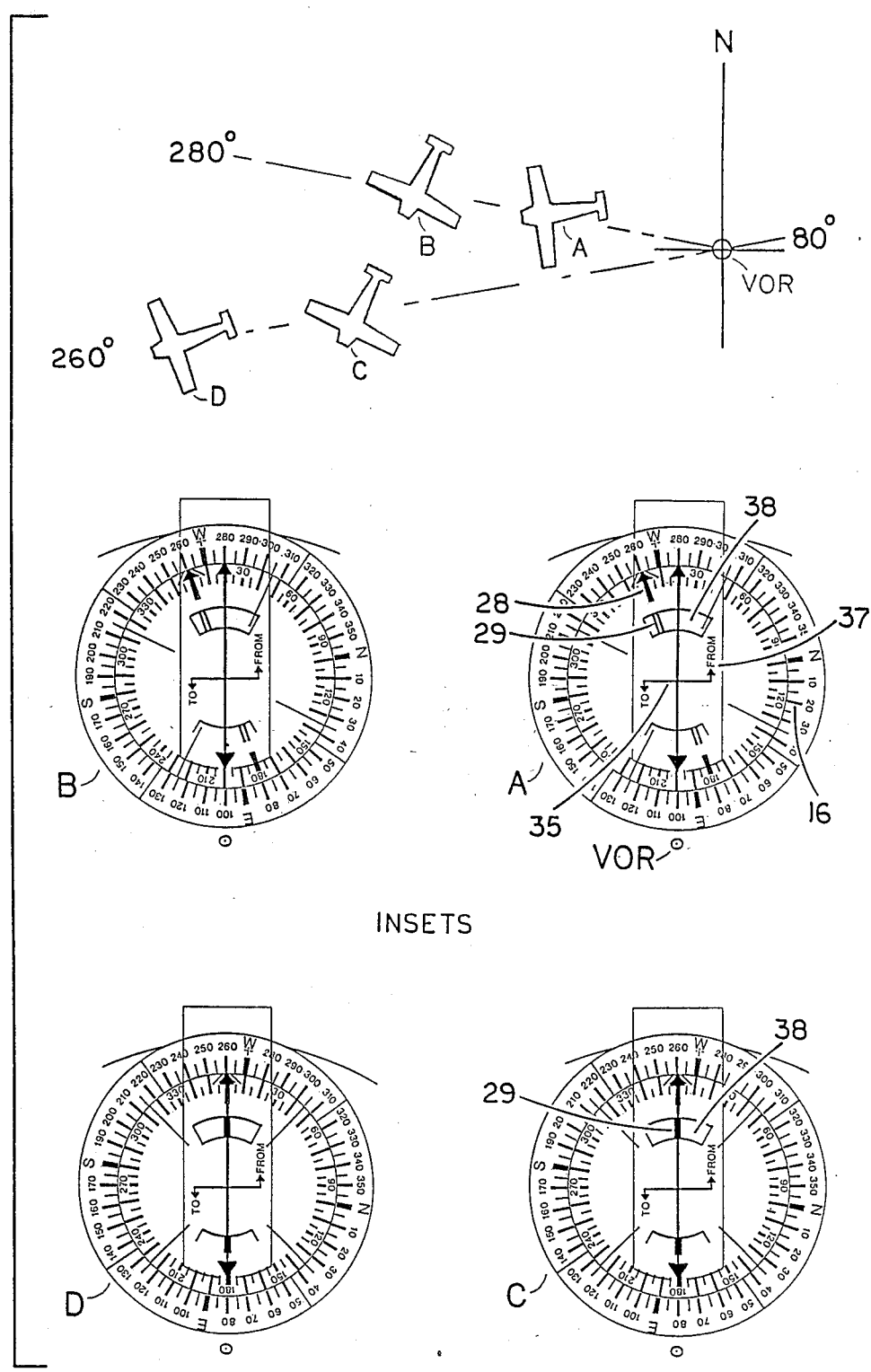
FIG. 11 shows aircraft positions and simulator insets that illustrate use of the simulator for VOR radial intercept and navigation outbound from a beacon.
Figure 12:
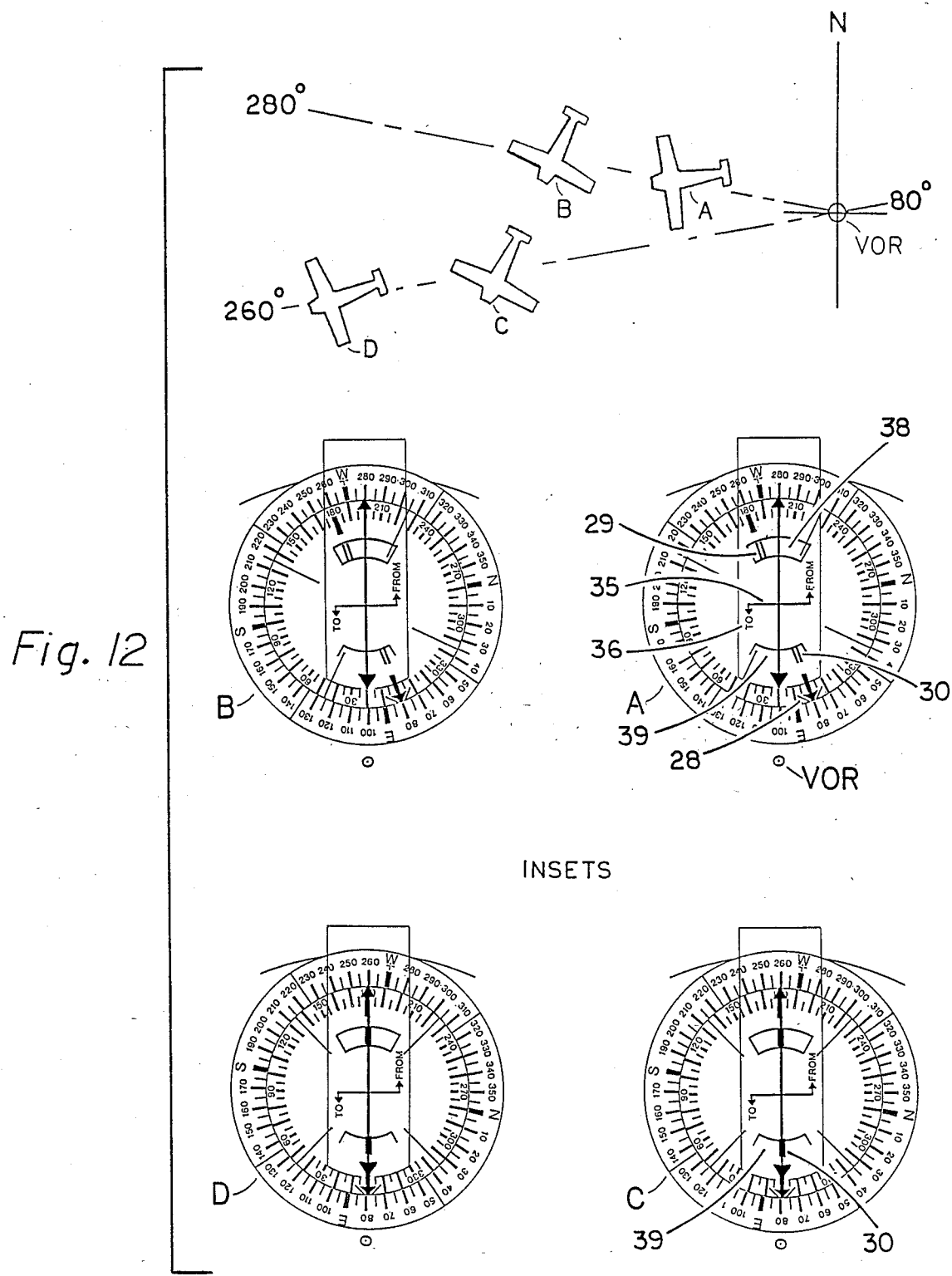
FIG. 12 shows the same navigation situation as FIG. 11, but with the simulator set to illustrate "reverse sensing".

FIGS. 10, 11 and 12 illustrate typical VOR navigation problems. Referring to FIG. 10, the aircraft shown in position A is on the 100 degree radial and is flying in a generally south-west direction. This situation is shown in the corresponding simulator inset marked A. Note: arrow (28) which was the heading indicator for ADF navigation simulation does not have that function for VOR navigation simulation. For VOR navigation simulation, arrow (28) will be used as an omnibearing selector (OBS).

In inset A, radial arrow (33) points to 100 degrees on dial (16) of orbiting disc (3) indicating position of the aircraft on the 100 degree radial. The pilot wishes to intercept the 80 degree radial and fly inbound to the VOR. Accordingly, inset A shows the omnibearing selector—OBS (28) set to 260 degrees on dial (16) which is the no-wind heading required to fly inbound to the VOR on the 80 radial. In this situation, the pilot has entered a heading into the OBS which would (if flown) bring the aircraft closer to the VOR. Therefore, the TO flag will be visible, as previously explained. Consequently when using the simulator, any setting of the OBS (28) on the TO (arrow (36)) side of TO-FROM line (35) will assume a TO flag to be visible; and conversely, any setting on the FROM (arrow (37)) side will assume the FROM flag to be visible.

In FIG. 10, Window (38) simulates the window marked (38) in FIG. 8 and course deflection indicator (CDI) (29) simulates the VOR indicator marked (29) in FIG. 8. CDI (29) is shown in a right deflected position (dotted line marked 40) in FIG. 8 which is identical to the deflection shown in simulator inset A of FIG. 10.

When flight is toward the VOR, the simulator should be viewed as shown in inset A with the VOR at the top. When the aircraft is flown toward the VOR with the TO flag visible, the aircraft should be turned toward the deflected CDI to center it and intercept the radial selected. Therefore, the aircraft shown in A should be turned to the right.

The aircraft in position B has turned right to head toward an 80 degree radial intercept. Since the VOR instrument is not sensitive to aircraft heading (except as it effects interpretation of the VOR Meter reading), simulator inset B shows no change from inset A.

When the aircraft has intercepted the 80 degree radial as in position C, simulator inset C shows CDI (29) centered. In position D the aircraft has turned to the inbound (selected) heading of 260 degrees, but simulator inset D shows the same centered CDI as inset C and will not change as long as the OBS is not changed and the aircraft stays on the 80 degree radial.

In FIG. 11 the aircraft in position A was outbound from the VOR on a 260 degree heading, but has drifted to the 280 radial. Simulator inset A shows how the simulator must be viewed for all outbound headings with the VOR at the bottom. The OBS (28) is set at 260 degrees on Dial (16); OBS (28) is set on the FROM side of TO-FROM line (35), so the FROM flag is visible; and CDI (29) is deflected left in window (38). Since the aircraft is outbound with the FROM flag visible, the instrument is "forward sensing" and the pilot must turn left (or fly toward the CDI) to center the CDI and intercept the desired radial.

Position B shows the aircraft in a left turn and as before simulator inset B is the same as inset A since the VOR meter is not sensitive to aircraft heading. In position C the aircraft has intercepted the 260 degree radial and simulator inset C shows CDI (29) centered in window (38) indicating that the aircraft is on the selected radial. In position D the aircraft has turned to a heading slightly less than 260 degrees to compensate for wind and as long as the CDI (29) remains centered, the aircraft is on the selected radial.

In FIG. 12 the example is the same as that of FIG. 11 except that the OBS (28) has been set to 080 degrees and the TO flag is now visible. When the OBS (28) is set on the TO side of TO-FROM line (35), TO flag (36) will be visible and if the aircraft is outbound as it is in position A, the VOR instrument is said to be "reverse sensing" and reverse sensing window (39) and reverse sensing CDI (30) must be used instead of forward sensing window (38) and forward sensing CDI (29).

With reverse sensing CDI (30) deflected right in window (39), the aircraft must be turned left (or away from the CDI) to center it and intercept the selected radial. Posiion B shows this turn to the left and the simuator inset B remains unchanged as before. The aircraft has intercepted the 260 degree radial in position C and simulator inset C shows reverse sensing CDI (30) centered in window (39). As before, the aircraft turns to an outboard heading of slightly less than 260 degrees to compensate for wind and simulator inset D remains the same as simulator inset C (again, a change in aircraft direction does not affect the instrument readings).

Since most modern aircraft use both ADF and VOR for basic navigation or as cross checks on more sophisticated systems, it is particularly valuable to have this unique combination ADF/VOR Simulator as a training device for inexpensive home study and as a reference aid in the cockpit during actual aerial navigation.

Throughout this application the invention preferred embodiment is described as a simulator for aircraft ADF and/or VOR navigation systems. It should be emphasized, however, that the invention applies to ADF and/or VOR navigation systems as they may be applied to any vehicle: aircraft, landcraft, seacraft or other conveyance.

Also, it should be understood that although this invention has been described as embodied in a simulator for ADF and VOR navigation, this invention also encompasses the use of novel features of the device in other types of applications for providing information (per the first object of the invention previously stated).

I claim as my invention:

1. A mechanical analog computer device comprising an indicia bearing support member, and an indicia bearing orbital member mounted for non-rotational movement relative to said support member; said orbital member being mounted to said support member by a plurality of link members.

2. The invention claimed in claim 1 wherein said plurality of link members comprise:
   a. Three link members of equal length each having first and second opposite ends respectively;
   b. means rotatably mounting the first ends of said link members on said support member such that a straight line passing through the center of said support member will intercept two of said first ends, and a second straight line perpendicular to the first line and passing through the center of said support member will intercept the third of said first ends; and
   c. means rotatably mounting the second ends of said link members to said orbital member such that a straight line passing through the center of said orbital member will intercept two of said second ends, and a straight line perpendicular to the first line and passing through the center of said orbital member will intercept the third of said second ends with the pattern dimensions of said second ends on said orbital member identical to the pattern dimensions of said first ends on said support member.

3. A vehicle Automatic Direction Finder (ADF) training device comprising
   a support member having a center representing a ground position and surrounding indicia of direction projecting radially outward from said ground position;
   an orbital member having a center and surrounding indicia of direction used dually for indications of radials and vehicle headings;
   a meter member, having a center and surrounding indicia of direction and having means for indicating the heading of a vehicle; means coupling together, at their respective centers, said meter member and said orbital member for relative rotation to point said heading indication means to selected indicia of direction on said orbital member;
   means coupling together said support member and said orbital member for non-rotational orbital movement of said orbital member about a center on said support member, said coupling means including a plurality of link members extending from said support member to said orbital member to provide non-rotational orbital movement between said orbital member and said support member;
   a lever member rotatably coupled to the center of said support member and extending therefrom and coupled to the center of said orbital member;
   on said lever member:
   a. first indicia means representative of an automatic direction finder indicating needle positioned so that it points to said ground position on said support member and simultaneously to indicia of direction on said meter member, such indicia of direction representing simulated automatic direction finder meter readings;
   b. second indicia means representative of a radial indicator positioned so that it points to indicia of direction on said orbital member.

4. The invention claimed in claim 3, wherein said plurality of link members comprise:
   a. Three link members of equal length each having first and second opposite ends respectively;
   b. means rotatably mounting the first ends of said link members to said support member such that a straight line passing through the center of said support member will intercept two of said first ends, and a second straight line perpendicular to the first line and passing through said support member center will intercept the third of said first ends; and
   c. means rotatably mounting the second ends of said link members to said orbital member such that a straight line passing through the center of said orbital member will intercept two of said second ends, and a second straight line perpendicular to the first line and passing through said orbital member center will intercept the third of said second ends, with the pattern dimensions of said second ends on said orbital member identical to the pattern dimensions of said first ends of said support member.

5. The invention claimed in claim 4, wherein said means mounting said first ends to said support member comprise pin members fixed to said link members at said first ends and rotatably mounted into holes in said support member, and said means mounting said second ends to said orbital member comprise pin members fixed to the opposite face of said link members at said second ends and rotatably mounted into holes in said orbital member.

6. The invention claimed in claim 5, wherein said lever member is rotatably coupled to said support member by a pin member fixed to said lever member and rotatably mounted into a hole at the center of said support member, said lever member having sufficient flexibility such that when said pin member is positioned in the hole at the center of said support member and said lever member is distorted to couple to the center of said orbital member, sufficient pressure is exerted to hold all elements together and allow free operation without permanent fastening.

7. The invention claimed in claim 6, wherein said lever member is transparent such that, when assembled, markings on said lever as well as indicia of direction and other markings on said orbital member and said meter member will be visible through said lever member.

8. A mechanical linkage for mounting an orbital member to a support member for non-rotational orbiting movement, said linkage comprising:
   a. three link members of equal length each having first and second opposite ends respectively;
   b. means rotatably mounting the first ends of said link members on said support member such that a straight line passing through the center of said support member will intercept two of said first ends, and a second straight line perpendicular to the first line and passing through the center of said support member will intercept the third of said first ends; and
   c. means rotatably mounting the second ends of said link members on said orbital member such that a straight line passing through the center of said orbital member will intercept two of said second ends, and a straight line perpendicular to the first line and passing through the center of said orbital member will intercept the third of said second ends, with a pattern dimensions of said second ends on said orbital member identical to the pattern dimensions of said first ends on said support member.

9. The invention claimed in claim 8, wherein said means mounting said first ends to said support member comprise pin members fixed to said link members at said first ends and rotatably mounted into holes in said support member, and said means mounting said second ends to said orbital member comprise pin members fixed to the opposite face of said link members at said second ends and rotatably mounted into holes is said orbital member.

10. The invention claimed in claim 9, wherein a lever member is rotatably coupled to said support member by a pin member fixed to said lever member and rotatably mounted into a hole at the center of said support member, said lever member having sufficient flexibility such that when said pin member is positioned in the hole at the center of said support member and said lever member is distorted to couple to the center of said orbital member, sufficient pressure is exerted to hold all elements together and allow free operation without permanent fastening.

11. A vehicle Very High Frequency Omnibearing Range (VOR) training device comprising a support member having a center representing a ground position and surrounding indicia of direction projecting radially outward from said ground position;

an orbital member having a center and surrounding indicia of direction, said indicia used dually for indicating radials and omibearing dial settings;

a meter member, having a center, surrounding indicia of direction and means for indicating omnibearing setting and course deflection;

means coupling together at their respective centers said meter member and said orbital member for resistable rotation of said meter member to point said omnibearing indication means to selected settings on said omnibearing dial;

means coupling together said support member and said orbital member for non-rotational orbital movement of said orbital member about a center on said support member;

a lever member, rotatably coupled to the center of said support member and extending therefrom, and coupled to the center of said orbital member;

on said lever member:

a. first indicia means representative of course deflection indicator gauges with the centered or "on course" positions marked, and having sufficient opening such that the course deflection indication means on said meter member can be viewed in the gauge areas;

b. second indicia means representative of a "TO" or "FROM" flag condition;

c. third indicia means representative of a radial indicator positioned so that it points to indicia of direction on said orbital member.

12. The invention claimed in claim 11, wherein means for coupling together said support member and said orbital member for non-rotational orbital movement of said orbital member about the center of said support member comprise a plurality of link members extending from said support member to said orbital member to allow orbital movement.

13. The invention claimed in claim 12, wherein said plurality of link members comprise:

a. three link members of equal length having first and second opposite ends respectively;

b. means rotatably mounting the first ends of said link members on said support member such that a straight line passing through the center of said support member would intercept two of said first ends, and a second straight line perpendicular to the first line and passing through said support member center will intercept the third of said first ends; and c. means rotatably mounting the second ends of said link members to said orbital member such that a straight line passing through the center of said orbital member will intercept two of said second ends, and a second straight line perpendicular to the first line and passing through said orbiting disc center will intercept the third of said second ends, with the pattern dimensions of said second ends on said orbital member identical to the pattern dimensions of said first ends on said support member.

14. The invention claimed in claim 13, wherein the means mounting said first ends to said support member comprise pin members fixed to said link members at said first ends and rotatably mounted into holes in said support member, and means mounting said second ends to said orbital member comprise pin members fixed to the opposite face of said link members at said second ends and rotatably mounted into holes in said orbital member.

15. The invention claimed in claim 14, wherein said lever member is rotatably coupled to said support member center by a pin member fixed to said lever member and rotatably mounted into a hole at the center of said support member, said lever member having sufficient flexibility such that when said pin member is positioned in the hole at the center of said support member, and said lever member is distorted to couuple to the center of said orbital member, sufficient pressure is exerted to hold all elements together and allow free operation without permanent fastening.

16. The invention claimed in claim 15, wherein said lever member has imprinted representations of two course deflection indicator windows, one for forward sensing and the other for reverse sensing.

17. The invention claimed in claim 16, wherein said lever member is transparent such that, when assembled, markings on said lever as well as indicia of direction and other markings on said orbital member and said meter member will be visible through said lever member.

18. A vehicle combination Automatic Direction Finder and Very High Frequency Omnibearing Range training device comprising a support member having a center representing a ground position and surrounding indicia of direction radially outward from said ground position;

an orbital member having a center and surrounding indicia of direction used tripley for indications of radials, vehicle headings and omnibearing dial settings;

a meter member, having a center and surrounding indicia of direction and having means for indicating the heading of a vehicle or omnibearing setting, and course deflection;

means coupling together at their respective centers said meter member and said orbital member for resistible rotation of said meter member to dually point said vehicle heading indication means to selected indices direction on said orbital member or to point said omnibearing indication means to selected omnibearing settings on said orbital member;

means coupling together said support member and said orbital member for non-rotational orbital movement of said orbital member about a center of said support member;

a lever member, rotatably coupled to the center of said support member and extending therefrom, and coupled to the center of said orbital member;

on said lever member:

a. first indicia means representative of course deflection indicator gauges with the centered or "on course" positions marked, and having sufficient openings such that the course deflection indication means on said meter member can be viewed in the gauge areas;

b. second indicia means representative of a "TO" or "FROM" flag condition;

c. third indicia means representative of an automatic direction finder indicting needle positioned so that it points to said ground position on said support member and simultaneously to indicia of direction on said meter member, such indicia of direction representing simulated automatic direction finder meter readings;

d. fourth indicia means representative of a radial indicator positioned so that it points to indicia of direction on said orbital member.

19. The invention claimed in claim 18, wherein means for coupling together said support member and said orbital member for non-rotational orbital movement of said orbital membr about the center of said support member, comprise a plurality of link members extending from said support member to said orbital member to allow orbital movement.

20. The invention claimed in claim 19, wherein said plurality of link members comprise:

a. three link members of equal length having first and second opposite ends respectively;

b. means rotatably mounting the first ends of said link members on said support member such that a straight line passing through the center of said support member would intercept two of said first ends, and a second straight line perpendicular to the first line and passing through said support member center will intercept the third of said first ends; and c. means rotatably mounting the second ends of said link members to said orbital member such that a straight line passing through the center of said orbital member will intercept two of said second ends, and a second straight line perpendicular to the first line and passing through said orbital member center will intercept the third of said second ends, and the pattern dimensions of said second ends on said orbital member are identical to the pattern dimensions of said first ends on said support member.

21. The invention claimed in claim 20, wherein the means mounting said first ends to said support member comprise pin members fixed to said link members at said first ends and rotatably mounted into holes in said support member, and the means mounting said second ends to said orbital member comprise pin members fixed to the opposite face of said link members at said second ends and rotatably mounted into holes in said orbital member.

22. The invention claimed in claim 21, wherein said lever member is rotatably coupled to said support member by a pin member fixed to said lever member and rotatably mounted into a hole at the center of said support member, said lever member having sufficient flexibility such that when said pin member is positioned in the hole at the center of said support member and said lever member is distorted to couple to the center of said orbital member, sufficient pressure is exerted to hold all elements together and allow free operation without permanent fastening.

23. The invention claimed in claim 22, wherein said lever member has imprinted representations of two course deflection indicator windows, one for forward sensing and the other for reverse sensing.

24. The invention claimed in claim 23, wherein said lever member is transparent such that, when assembled, markings on said lever as well as indicia of direction and other markings on said orbital member and said meter member will be visible through said lever member.

* * * * *